Aug. 7, 1923.
L. A. CALAME
1,464,256
CLUTCH LOCK FOR MOTOR VEHICLES
Filed March 2, 1922
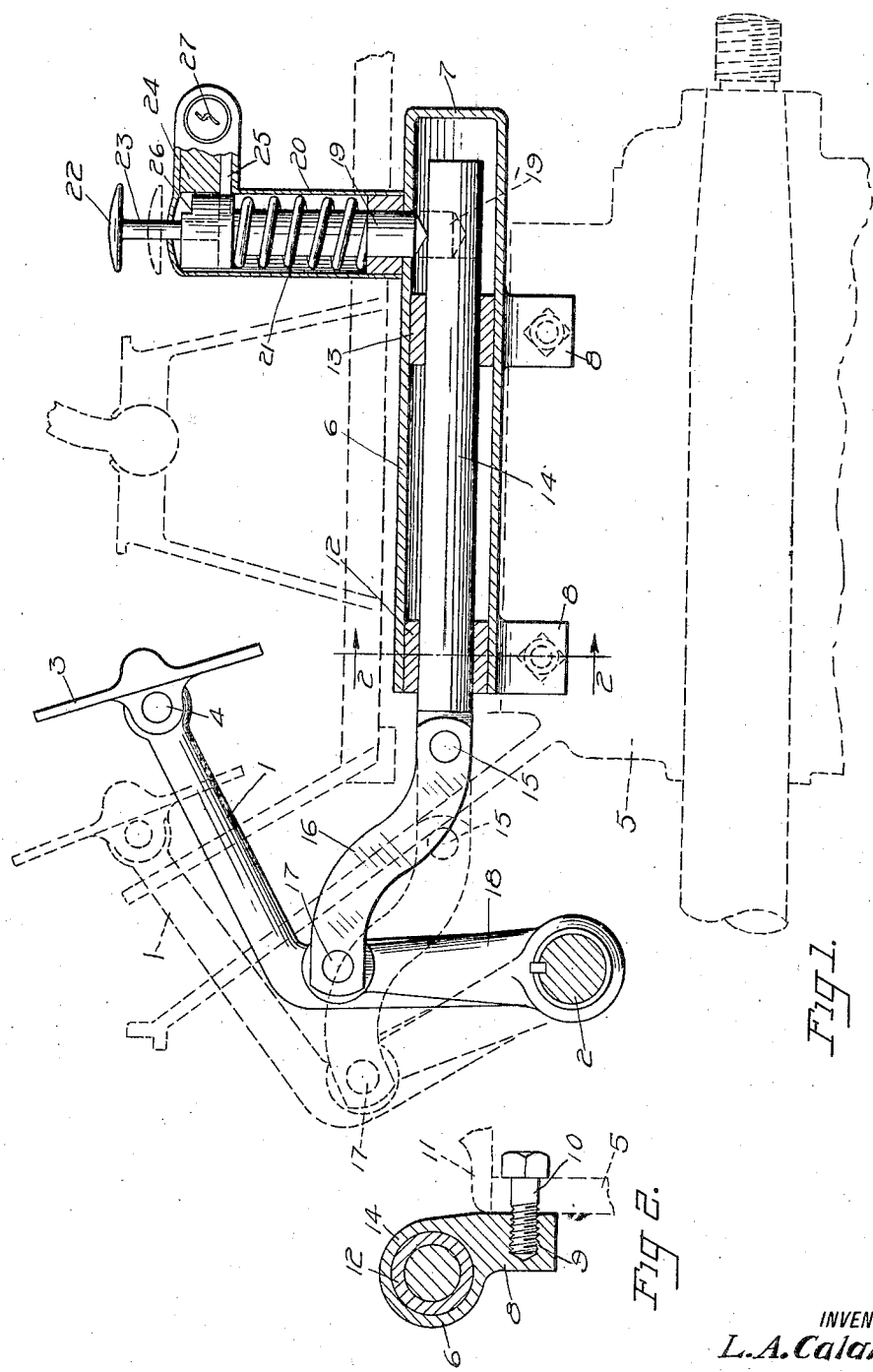
INVENTOR
L. A. Calame
BY
ATTORNEYS Patented Aug. 7, 1923.

1,464,256

UNITED STATES PATENT OFFICE.

LLOYD ARMAND CALAME, OF FREEPORT, ILLINOIS.

CLUTCH LOCK FOR MOTOR VEHICLES.

Application filed March 2, 1922. Serial No. 540,456.

*To all whom it may concern:*

Be it known that I, LLOYD ARMAND CALAME, a citizen of the United States, and a resident of Freeport, in the county of Stephenson and State of Illinois, have invented a new and useful Improvement in Clutch Locks for Motor Vehicles, of which the following is a full, clear, and exact description.

My invention relates to improvements in clutch locks for motor vehicles, and it consists in the combinations, constructions and arrangements herein described and claimed:

An object of my invention is to provide a device of the character described, in which means is provided for positively locking the transmission clutch in a position to disconnect the motor from the transmission mechanism.

A further object of my invention is to provide a device of the character described, which may be readily and easily attached to the standard type of motor vehicle in common use.

A further object of my invention is to provide a device of the character described which is entirely concealed from view with the exception of the foot plunger and the adjacent spring lock.

A further object of my invention is to provide a device of the character described, which is simple to operate, which is compact in form and thoroughly practical for the purpose intended.

Other objects and advantages will appear in the following specification, and the novel features of the invention will be particularly pointed out in the appended claim.

My invention is illustrated in the accompanying drawings, forming part of this application, in which Fig. 1 is a sectional view of an embodiment of my invention, and Fig. 2 is a sectional view along the line 2—2 of Fig. 1.

In carrying out my invention, I make use of a motor vehicle having a power plant, which is adapted to drive the car through a clutch mechanism, which clutch mechanism is operative to disconnect the engine from the transmission mechanism by pressing a foot lever 1. The foot lever 1 is carried by a transverse rock shaft 2, which shaft is connected directly to the clutch mechanism (not shown).

When a foot pedal 3 disposed at the outer end 4 of the lever 1 is manually pressed, the lever 1 will assume the position in dotted lines in Fig. 1 and the clutch mechanism (not shown) will cause the engine to be disconnected from the transmission mechanism. The transmission mechanism is housed within a casing 5. My present invention consists of a means for locking the shaft 2 in a position shown in dotted lines in the drawing, thus locking the clutch so that the engine is out of engagement with the transmission of the car. This means comprises a cylindrical sleeve 6 having one end 7 closed. The sleeve 6 is provided with a pair of downwardly extending lugs 8. The lugs 8 have threaded bores 9 in one side thereof. With reference to Fig. 2, it will be seen that the bores 9 provide means for securing the sleeve 6 in its adjusted horizontal position adjacent the top of the transmission casing 5. This is done by inserting threaded bolts 10 from the inner side of the casing 5, it being necessary to first remove the top plate 11 of the casing.

A pair of bushings 12 and 13 are disposed within the sleeves 6 and provide bearing means for a horizontally and slidably disposed shaft 14. The shaft 14 has pivotally connected at one end thereof, as shown at 15, an S-shaped link 16. The opposite end of the link 16 is pivotally connected at 17 to the outer end of a short lever arm 18 carried and keyed to the shaft 2.

It will thus be seen that when the lever 1 is pressed downwardly, that the shaft 14 will move outwardly in the bushings 13 and 14 to the position shown in dotted lines in Fig. 1.

Means for locking the shaft 14 in the position shown in the dotted lines is provided in a vertical plunger 19 disposed within a vertical sleeve 20, which sleeve 20 is carried by the sleeve 6. A spiral spring 21 serves to normally hold the plunger 19 in an elevated position, i. e., out of engagement with the joint 14. A foot pedal 22 is disposed at the upper end of a small vertical stem 23 disposed at the upper end of the plunger 19. When the foot pedal 22 is pressed downwardly as by the heel of the driver, the plunger 19 will be forced against the action of the spring 21 into the sleeve 6 and to the position shown in dotted lines in Fig. 1. This condition may only be brought about when the lever 1 is in the position shown in dotted lines, since otherwise the plunger 19 would strike the upper surface of the shaft 14.

Means for locking the plunger 19 when pressed downwardly is provided in a spring actuated lock mechanism 24 having a plunger 25, which plunger is pressed into engagement with a notch 26 at the top of the plunger 19 as the plunger is pressed downwardly.

In order to release the plunger 25 from the notch 26, it is necessary to employ a key (not shown), which key is adapted to fit the key slot 27 of the spring lock mechanism 24 and by means of which the plunger 25 may be withdrawn.

From the foregoing description of the various parts of the device, the operation thereof may be readily understood. When it is desired to lock the motor vehicle, upon which my invention is used, it is merely necessary to press the clutch foot pedal downwardly, as in disengaging the clutch. The foot is held upon the pedal 3 with the lever in the position shown in dotted lines in Fig. 1. The other foot is then brought into engagement with the foot pedal 22. This foot pedal 22 is then pressed downwardly. In doing so, the plunger 19 will be moved against the action of the spring 21 and will assume a position immediately in the rear of the horizontal shaft 14. The plunger 19 will remain in this position by engagement of the plunger 25 and the notch 26 of the plunger 19 in the manner heretofore described. The foot may then be removed from the pedal 22 and the other foot removed from the pedal 3. It will be noted that because the horizontal shaft 14 cannot recede in its bushings 12 and 13, that the lever 1 will be held in the position shown in dotted lines and the clutch will be locked in its disengaged position.

I claim:

A device of the character described comprising a sleeve adapted to be mounted on a motor vehicle, a shaft mounted for reciprocation within the sleeve, said shaft being adapted for connection with the clutch operating pedal of said motor vehicle, a second sleeve perpendicular to said first named sleeve and communicating therewith, a spring pressed plunger disposed in said perpendicular sleeve and arranged to be manually projected into said first named sleeve when said shaft is disposed at one end of its reciprocated movement and out of registration with said perpendicular sleeve whereby said shaft may abut said plunger in said perpendicular sleeve and be stopped from further movement in said sleeve, and a lock for securing said plunger down against the action of said spring, said lock being arranged to release said plunger at will.

LLOYD ARMAND CALAME.